UNITED STATES PATENT OFFICE.

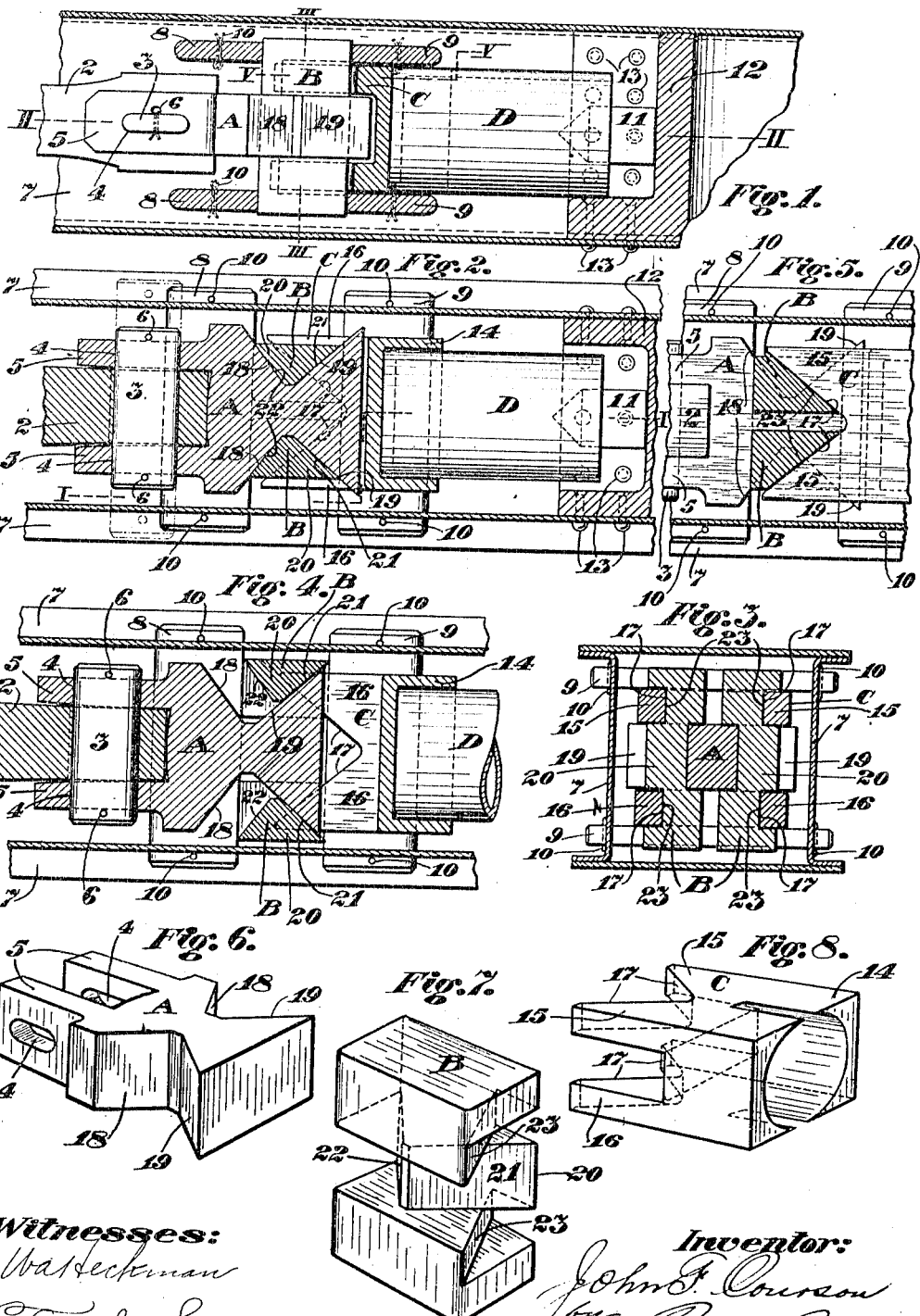
J. F. COURSON.
DRAFT GEAR.
APPLICATION FILED FEB. 19, 1913.
1,089,908.
Patented Mar. 10, 1914.
Witnesses:
Inventor:
John F. Courson
by O. M. Clarke
his attorney

JOHN F. COURSON, OF PITCAIRN, PENNSYLVANIA.

DRAFT-GEAR.

1,089,908.

Specification of Letters Patent.   Patented Mar. 10, 1914.

Application filed February 19, 1913.   Serial No. 749,397.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists of an improvement in friction draft gears for railway cars, etc., and it has for its objects to provide a draft gear of simple construction and high efficiency, designed to utilize the wedging and releasing qualities of friction-creating wedge blocks between a central buffing member and any suitable shock-absorbing member, as the casing of any usual or ordinary friction or spring gear, or both, or a shock absorbing device secured to the car framing itself, so arranged to coöperate with the said elements, as shall be more fully hereinafter described.

The particular object of the invention is to provide in a friction draft gear, means for effecting rearward strains to the car framing through an interposed shock-absorbing device, as a friction or spring gear, or both, either in buffing or pulling. In other words, mechanism whereby backward pressure is exerted against the shock-absorbing device upon the transmission of pulling or buffing strains from the drawbar to interposed communicating mechanism. This effect is produced by means of a double acting wedge member connected with the drawbar, a pair of compound double acting wedge members having angle faces adapted to co-act with the wedge members of the drawbar, and other faces adapted to co-act under either buffing or pulling strains, with the wedge faces of the main shock-absorbing member of the car framing. These objects are accomplished by the construction illustrated in the accompanying drawings showing one preferred form of the invention in which—

Figure 1 is a central vertical sectional view of the complete draft gear assembled, the parts being in normal extended position, the section being indicated by the line I. I. of Fig 2. Fig. 2 is a horizontal sectional view, indicated by the line II. II. of Fig. 1. Fig. 3 is a cross sectional view, indicated by the line III. III. of Fig. 1. Fig. 4 is a partial sectional view to Fig. 2 showing the operation of the device under pulling strains. Fig. 5 is a partial horizontal sectional view indicated by the line V. V. of Fig. 1. Fig. 6 is a perspective detail view of the compound wedge member for the drawbar. Fig. 7 is a similar view of one of the compound wedge members interposed between said wedge member and the wedge member of the shock-absorbing element. Fig. 8 is a similar view of the wedge member of the shock-absorbing element.

In the drawings, 2 represents the drawbar of the coupler fixedly connected with the wedge member A by a transverse key 3 extending through openings 4 in cheek 5 of member A and through a suitable receiving opening in the rear portion of the drawbar, the key 3 being preferably held in position by cotters 6 or other suitable means.

Extending transversely of the center sills and through openings therein, are the cross bar members or keys 8, 8, and 9, 9, respectively, secured by cotters 10 or otherwise, and defining by their inner edges guiding ways or faces for the intervening laterally movable compound wedges B, B.

The shock-absorbing member D, which may be of any suitable construction embodying spring gear or friction gear mechanism, or both, is mounted between the rear cross bars 9, 9, extending backwardly and engaging by its wedge mechanism, not shown, a central wedge post 11 abutting rearwardly against the transverse abutment 12 which is rigidly secured between the center sills 7 by rivets 13 or otherwise, as desired.

The front end of member D is provided with the wedge member C embracing the front end of the cylindrical casing by its rear housing portion 14, or otherwise, and having at its front end forwardly extending wedge members 15, 15, and 16, 16, respectively, provided with inner wedge faces 17.

Wedge member A of the coupler is provided at opposite sides with buffing wedge faces 18, 18, and pulling wedge faces 19, 19, respectively forming the surfaces of the opposing wedge members, as clearly shown. The wedge faces 19 are disposed at an angle of 45°, more or less, to the axial center of the gear, while the wedge faces 18 are somewhat more blunt, as shown.

The compound wedge members B are mounted between the cross bar or abutment members 8, 8, and 9, 9, and in operative engagement with the wedge members A and C. Each of the members B is provided with a middle wedge section 20 having inner faces 21 and 22 respectively, adapted to co-act with and corresponding to the angle of inclination of faces 19 and 18 of member A.

Above and below the middle wedge member 20 and at the rear portion of each of the members B are the wedge faces 23, 23, respectively of the same inclination, and designed to co-act with the wedge faces 17 of member C, as members B are spread apart by faces 18 in buffing, or 19 in pulling, of drawbar member A.

It will be understood that the spring or wedge mechanism, or both, inclosed in casing D, and opposing the resisting action of wedge 11 thereof, will, in normal position, press the housing member 14 and its wedges forwardly, and by action of faces 17 on faces 23, will collapse the wedge members B inwardly, as shown in Fig. 2. Upon pulling strains being imparted to the gear through drawbar 2, wedge member A will be drawn forwardly, as in Fig. 4, its faces 19 forcing wedge members B outwardly in opposite directions along the faces of cross bars 8 and 9, the wedge faces 23 of member B acting against faces 17 of the gear housing and thrusting said housing backwardly, compressing opposing mechanism therein and absorbing the shock. In buffing, wedge member A is thrust backwardly, its wedge faces 18 engaging opposing wedge faces 22 of member B, laterally separating said members and effecting the backward movement of the housing or casing D by engaging the wedge faces 17 thereof by faces 23 in the same manner as occurs in pulling, except that members B are now thrust outwardly by the separating action of the wedge faces 18 of member A in the opposite direction. In either operation, i. e. pulling or buffing, the effect is to produce backward movement of the gear casing D, by the lateral travel of members B and the wedging action of their faces 23. It will thus be seen that the casing of shock-absorbing member D always travels in the same direction under strains of either pulling or buffing, and always operates to re-assemble the parts to normal position, by its internal expanding pressure, upon release of pressure in either direction.

The advantage in making the wedge faces 18 of member A somewhat less acute than faces 19 is that the comparatively heavier buffing shocks will effect substantially the same separation of members B as in pulling, but with a considerable increase of wedge opposition. The angle of inclination of the several wedge members, however, is a matter of adjustment or is to be determined by varying conditions present in service of the gear, and I do not desire to be limited to the exact arrangement herein shown as to the degree of slope of the several angle wedge faces.

The construction and operation of the invention will be readily appreciated from the foregoing description and the accompanying drawings.

The gear is very compact and powerful, composed of few parts, and is easily installed or removed, and develops a very high capacity in opposition to either normal or abnormal shocks incident to car service.

The construction, design, proportions or other detail features of the invention may be variously changed or modified by the skilled mechanic, but all such changes are to be considered as within the scope of the following claims.

What I claim is:

1. In a friction draft gear, the combination with car framing, of a forwardly pressed shock absorbing member, a drawbar, and intervening co-acting face-to-face wedge mechanism adapted to impart backward pressure to the shock absorbing member in either pulling or buffing.

2. In a friction draft gear, the combination with car framing, of a forwardly pressed shock absorbing member, a drawbar, and intervening co-acting face-to-face wedge mechanism embodying a pair of oppositely acting spreading wedges operable to transmit strains from the drawbar to the shock absorbing member in a uniformly backward direction.

3. In a friction draft gear, the combination with car framing, of a forwardly pressed shock absorbing member having wedge faces, a wedge member engaging the drawbar, and wedge members directly engaging the faces of said drawbar wedge member and the wedge faces of the shock absorbing member respectively, and operable to transmit either pulling or buffing strains backwardly to the shock absorbing member.

4. In a friction draft gear, the combination with car framing, of a forwardly pressed shock absorbing member having wedge faces, a wedge member engaging the drawbar, and laterally movable wedge members directly engaging the faces of said drawbar wedge member and the wedge faces of the shock absorbing member respectively, and operable to transmit either pulling or buffing strains backwardly to the shock absorbing member.

5. In a friction draft gear, the combination with car framing, of a forwardly pressed shock absorbing member having wedge faces, a wedge member engaging the drawbar, laterally movable wedge members directly engaging the faces of the drawbar wedge member and the wedge faces of the shock absorbing member, operable to transmit either pulling or buffing strains backwardly to the shock absorbing member, and laterally arranged guides therefor.

6. In a friction draft gear, the combination with car framing, of a shock absorbing member having a forwardly extending portion provided with wedge faces, a drawbar, a wedge member connected to the drawbar, and a pair of compound wedge members engaging the drawbar wedge member and the wedge faces of the shock absorbing member respectively.

7. In a friction draft gear, the combination with car framing, of a shock absorbing member having a forwardly extending portion provided with wedge faces, a drawbar, a wedge member connected to the drawbar, and a pair of laterally movable compound wedge members engaging the drawbar wedge member and the wedge faces of the shock absorbing member respectively.

8. In a friction draft gear, the combination with car framing, of a shock absorbing member having a forwardly extending portion provided with wedge faces, a drawbar, a wedge member connected to the drawbar having oppositely disposed wedge faces at each side, and a pair of laterally movable compound wedge members each having oppositely disposed wedge faces for engagement by the faces of the drawbar wedge member and a wedge face engaging the wedge faces of the shock absorbing member.

9. In a friction draft gear, the combination with car framing, of a shock absorbing member having a forwardly extending portion provided with wedge faces, a drawbar, a wedge member connected to the drawbar having oppositely disposed wedge faces at each side, a pair of laterally movable compound wedge members each having oppositely disposed wedge faces for engagement by the faces of the drawbar wedge member and a wedge face engaging the wedge face of the shock absorbing member, and means providing transverse guides for the laterally movable compound wedge members.

10. In a friction draft gear, the combination with car framing, of a shock absorbing member having a forwardly extending portion provided with wedge faces, a drawbar, a wedge member connected to the drawbar having oppositely disposed wedge faces at each side, a pair of laterally movable compound wedge members each having oppositely disposed wedge faces for engagement by the faces of the drawbar wedge member and a wedge face engaging the wedge face of the shock absorbing member, and transversely arranged bars mounted in the car framing providing guides for the laterally movable compound wedge members.

11. In a friction draft gear, the combination of cross bars, a shock absorbing member having extended wedge portions, a drawbar, a wedge member connected to the drawbar, and wedge members engaging the drawbar wedge member, cross bars, and the wedge faces of the shock absorbing member respectively.

In testimony whereof I hereunto affix my signature in the presence of two witnessses.

JOHN P. COURSON.

Witnesses:
C. M. CLARKE,
FRED'K STAUB.